Dec. 12, 1972     I. F. WEISS     3,705,949

WIREWAY STRUCTURE

Filed Sept. 29, 1970     2 Sheets-Sheet 1

INVENTOR.
IRVING F. WEISS

BY Watts, Hoffmann
Fisher & Heinke
ATTORNEYS.

United States Patent Office 3,705,949
Patented Dec. 12, 1972

3,705,949
WIREWAY STRUCTURE
Irving F. Weiss, University Heights, Ohio, assignor to ECP Manufacturing Co., Cleveland, Ohio
Filed Sept. 29, 1970, Ser. No. 76,507
Int. Cl. H02g 3/00
U.S. Cl. 174—101       10 Claims

ABSTRACT OF THE DISCLOSURE

A wireway to be mounted on an electrical panelboard or the like to retain electrical wires in an orderly and accessible arrangement among electrical devices. An elongated wall that in part comprises the wireway has transverse, elongated, openings through which wires may extend. The openings in the principal embodiments are formed by fingers and are substantially wider at the ends than at the middle. Narrow passageways between the ends of the fingers permit lateral insertion of wires. Rectangular apertures in each finger, or parallel edge portions along opposite sides of the openings at midportions, are adapted to receive a retainer used to temporarily hold wires in place during wiring.

BACKGROUND OF THE INVENTION

Field of the invention

This invention relates to wireways, especially of the type used on electrical panelboards.

Description of the prior art

Wireways having spaced side walls through which the wires may extend for connection to electrical devices are well known. See, for example, U.S. Pat. No. 3,229,029 issued to Irving F. Weiss. At one time circular openings were provided in wireway side walls but more recently rectangular shaped openings have found general use. Such openings are elongated across the wireway wall and provide substantial area and height so that a wire can exit from the wireway at a level compatable with the location of a connecting terminal on adjacent electrical equipment to which the wire is connected. In so-called open-top or open-slot wireway, slot-like passageways are formed through the wall, at one end of each opening, in the extending edge of the wall that receives a cover. As a result, the wall portion between two successive openings forms a finger and wires can be positioned in the opening by bringing them in laterally through the passageway, which can be enlarged by flexing the finger, rather than threading the wires endwise through the opening. To provide many openings of substantial width, the fingers have been made relatively thin and as a result are quite flexible transversely of the wall. This can cause difficulty when a cover is applied because the fingers may tend to flex out of alignment, or they may bow when subjected to endwise pressure, as a cover is positioned over and pressed onto the ends of the fingers. This is especially true with covers having longitudinal socket portions that must be snapped over beads along the outer longitudinally extending edges of the parallel walls. Difficulties in applying covers to open-top wireway walls have reduced the acceptance of such walls in many installations, notwithstanding the somewhat greater convenience in threading of wires that may be provided by the edge passageways to the openings. The flexibility of the relatively thin wireway fingers is also disadvantageous from the standpoint of utilizing retaining fingers that are available to temporarily retain wires previoulsy installed, while additional wires are placed within the wireway, until the cover is in place. The retaining fingers are constructed to snap into the rectangular openings of existing wireway walls, extend part way across the wireway channel, and slide along the opening to hold or retain the wires. In the so-called open-slot design, the flexing of the side wall fingers renders the retaining fingers less secure than in the closed-top construction, and at or near the free ends of the wireway fingers, the retainers cannot be held in place at all.

SUMMARY OF THE INVENTION

In accordance with the present invention, improved wireway walls, especially those with an open-top wall construction, have been provided that have an increased resistance to bowing under endwise loads. At the same time, the wall construction provides openings that extend transversely of the wall to facilitate connecting wires to equipment terminals at various heights from the base of a panelboard on which the wireway and equipment is mounted. This improvement, as well as other advantageous features, is obtained with fingers of a new shape that resists bowing of the fingers at their midportions and which forms elongated openings between adjacent fingers that provide large areas at opposite ends through which wires may pass. The end portions of the apertures at the distal ends of the fingers are shaped to inhibit wires in the openings from escaping through passageways between the ends of adjacent fingers. More specifically, each finger is relatively narrow adjacent opposite ends, relatively wide at the midportion and terminates at its distal end in oppositely disposed projections in the nature of a cross portion that in part forms a bead for receiving and retaining a wireway cover. In addition, provision is made at the midportion of each finger to provide spaced parallel edges capable of being engaged by a retaining finger of the type useable with wireway walls having rectangular openings. In one preferred embodiment, the parallel edges are part of a closed aperture, assuring that the retaining fingers are securely held even if the side wall fingers are flexed.

One object of the present invention, as will be apparent from the foregoing, is to provide a new and improved wireway wall having a novel construction that provides spaced fingers that resist bowing and openings that provide full-height access for connecting wires to electrical equipment, which effectively retains wires within the openings and which facilitates the use of conventional wire-retaining fingers designed for use with walls having rectangular openings. This and other objects, features and advantages of the invention will become better understood from the detailed description that follows, when considered in connection with the accompanying drawings.

DETAILED DESCRIPTION OF PREFERRED EMBODIMENTS

Figure 1:
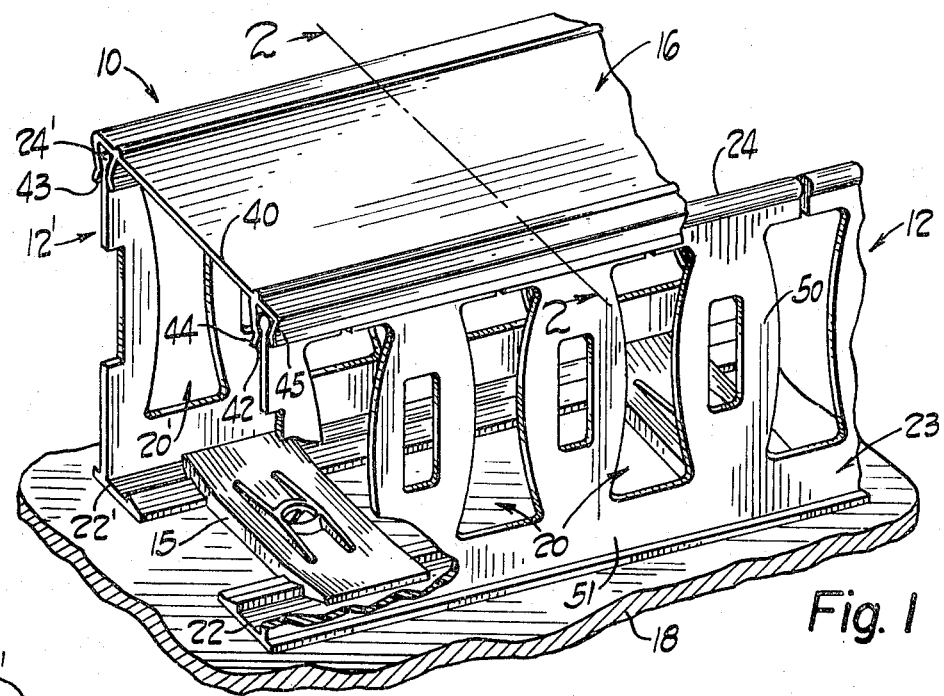
FIG. 1 is a fragmentary perspective view with parts broken away of a wireway embodying the present invention.

With reference to the drawings, a wireway 10 is shown in FIG. 1, embodying the present invention. The wireway is comprised of two identical side walls 12, 12', a plurality of side wall mounting clips 15 and a cover 16. The walls 12, 12' are elongated and are secured to a panelboard 18 in spaced, parallel, opposed, relationship by the clips 15, to form a channel for wires. Openings 20, 20' are formed in the side walls 12, 12', respectively. Wires extending along the channel between the walls can be brought through the openings 20, 20' on either side of the wireway for connection to terminals of electrical apparatus mounted on the panelboard. The cover 16 is removably secured to upper edges of the side walls and is affixed after a panelboard has been wired. The side walls 12, 12', the cover 16 and the clips 15 are made of semirigid material, preferably a synthetic or the like, such as plastic. The preferred synthetic plastic for the side walls and cover is a high-impact, rigid vinyl plastic that is noninflammable, an electrical insulator, easily fabricated, and sufficiently flexible for the purposes of this device. The clips are preferably made of nylon, polypropylene or similar plastic.

Figure 2:
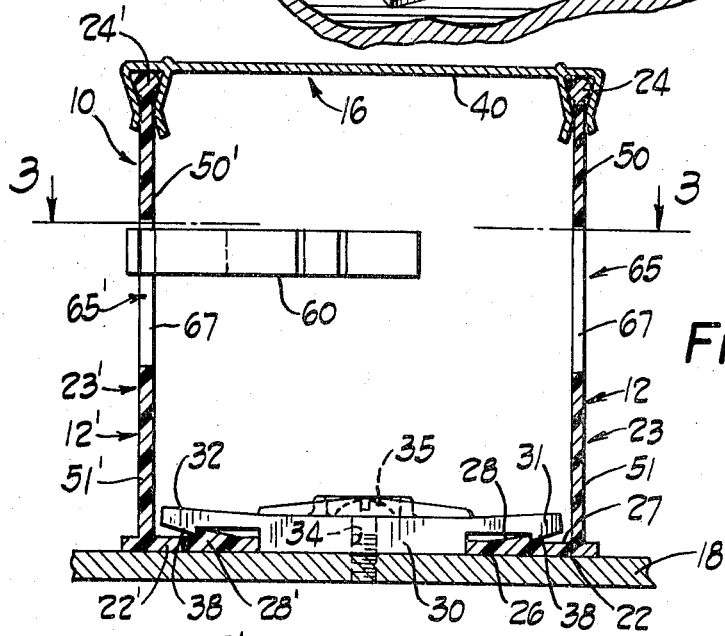
FIG. 2 is a cross sectional view of a wireway shown in FIG. 1, taken along the plane indicated by the line 2—2 in FIG. 1.

The side walls 12, 12' are both formed from identical side wall material that is substantially L shaped in cross section, as shown in FIG. 2. The walls are die cut to provide the required openings, such as the openings 20, 20', and are cut to the desired length for any particular installation. Each side wall is identical and only the side wall 12 will be described in detail. Corresponding parts on the side wall 12' will be indicated with like reference numerals and a prime designation. The side wall 12 includes a foot portion 22, a wall portion 23 extending from and at right angles to the foot portion 22, and a bead portion 24 along the edge of the wall opposite from the foot portion.

The foot portion 22 extends predominantly in one transverse direction from the wall portion 23, and the two side walls 12, 12' are arranged as shown in FIG. 1, so that the foot portions extend toward one another, within the channel formed by the two side walls. The foot portion 22 has a flat lower surface 26 adapted to rest on the panelboard 18 or other support. An upper surface 27 of the foot portion has a longitudinal ridge 28 that is gripped by the clips 15 to secure the side wall 12 to the panelboard. To retain a foot portion in position on each side, the clip 15 includes a heavy midportion 30 and extending end portions 31, 32 that are thinner than the midportion. A hold-down hole or aperture 34 in the midportion 30 receives a bolt or other fastening device 35 to rigidly secure the clip 15 to the panelboard 18. The undersurfaces of each end portion 31, 32 include ridges 38 that engage the ridges 28, 28' on the foot portions 22, 22' in the relationship shown in FIG. 2. When the foot portions 22, 22' are secured or snapped under the end portions 31, 32, the end portions are tensioned upwardly and exert a clamping pressure downwardly on the foot portions. The clamping pressure plus the cooperation between the ridges of the clip and each foot portion securely retain the side walls on the panelboard. Further details of the construction of the clips and foot portions of the side walls are more specifically disclosed in the aforesaid U.S. Pat. No. 3,229,029.

The cover 16 is elongated and typically of a length equal to the side walls 12, 12'. It includes a longitudinally extending back 40 and bead sockets 42, 43 along the longitudinal sides of the back that open in a common direction at right angles to the plane of the back. Each bead socket 42, 43 is formed of a pair of distensible lips indicated at 44, 45 in connection with the socket 42. The lips are so constructed and arranged that they will spread apart when the cover is forced onto the bead portions 24, 24' in a direction transversely of the side walls, i.e., downwardly in the orientation of FIGS. 1 and 2. Further, once the bead portions 24, 24' are received in the sockets, the lips exert pressure on opposite sides of the beads that retains the cover in a tight fixed relationship to the side walls. A suitable bead and socket construction is described in greater detail in the aforesaid U.S. Pat. No. 3,229,029.

Figure 4:
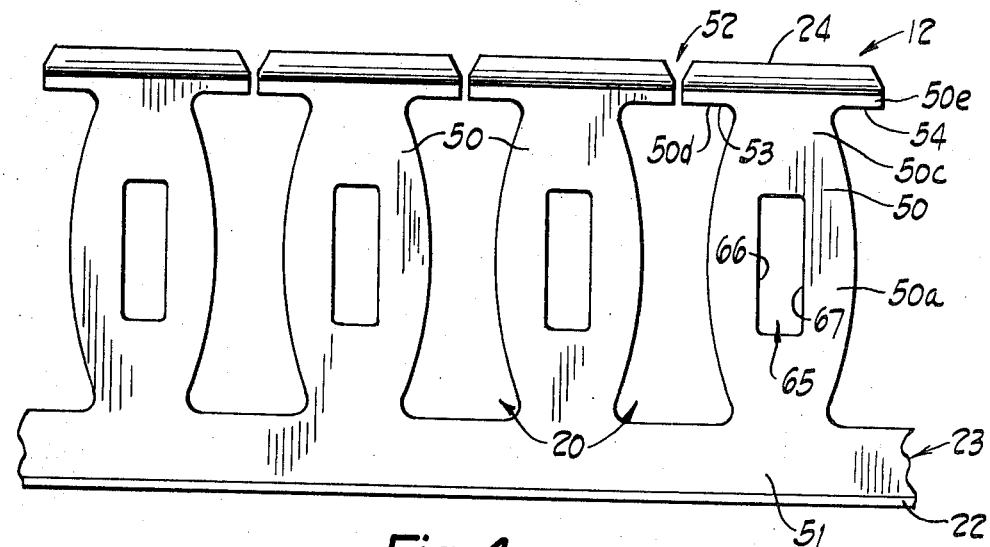
FIG. 4 is a fragmentary side elevational view of a wireway wall of the type shown in FIG. 1.

The wall portion 23 of the side wall 12 is best shown in FIG. 4 of the drawings. The spaced apertures 20 are formed by a plurality of fingers 50 connected together by and extending from a lower part 51 of the wall portion 23, which in turn is connected to and supported by the foot portion 22. It should be understood that the wall portion 23, which includes the fingers 50 and lower part 51 that interconnects the fingers, need not be supported by an integral foot portion, but rather could be supported in other suitable ways. For example, it could be secured directly to a base member of a wireway, either through an interfitting relationship or by mechanical fasteners, or could be a side portion of a one-piece U-shaped wireway channel.

The fingers 50 are of a particular shape selected to provide advantageous strength and rigidity while yet providing an adequate number of spaced apertures of suitable dimensions and area to accommodate the exit of wires from the wireway to adjacent electrical equipment on the panelboard. To this end, each finger 50 has a relatively wide central or midportion 50a and thinner portions 50b, 50c adjacent the opposite ends. By virtue of the relatively wide central portion of the fingers, each finger has substantial stiffness and resists bowing out of the plane of the side wall portion, when subjected to endwise forces, as experienced when a cover is pressed onto the upper or outer end. The thinner portion 50b at the connected end of each finger is preferably wider than the thin portion 50c adjacent the distal end of the finger, especially in walls of larger size wireway where the fingers are relatively long. This provides stiffness at the base of the finger, where the finger tends to flex from sideways forces and thus holds the fingers in alignment to facilitate affixing the cover. The decreased width of the portion 50c provides, along with the wider midportion 50a of the finger, a shape to the upper part of the opening that tends to trap wires and prevent their inadvertent escape through passageways 52 between adjacent fingers at the end openings.

The distal end of each finger terminates in oppositely directed, longitudinally extending projections 50d, 50e that in part form the bead portion 24. Each projection 50d, 50e terminates short of the projection on the adjacent finger, to form the passageway 52 to each opening 20. Inwardly facing edges 53, 54 of projections 50d, 50e in part form the opening 20 and extend at substantially a right angle to the longitudinal extent of each finger. It is the edges 53, 54 of the projections that, in conjunction with the thin portions 50c of the adjacent fingers, establish a shape to the upper portion of the opening 20 that tends to prevent the inadvertent escape of wires through the passageway 52 when the cover 16 is not attached, as during the wiring of a panel. The substantial width and area of the openings 20 at the base of the fingers 50 is advantageous to facilitate withdrawal of wires along the lower part of the wireway wall, where most wires extend.

Figure 3:
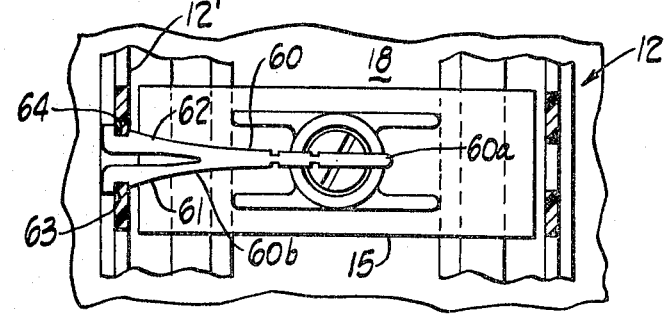
FIG. 3 is a partial sectional view of the wireway shown in FIG. 2, taken from the plane indicated by the line 3—3 in FIG. 2.

During the wiring of a panelboard, when wires are placed in a wireway channel, between side walls 12, 12', it is desirable to use a finger-like retainer 60, as shown in FIGS. 2 and 3, to aid in temporarily retaining the wires along the lower part of the wireway channel while other wires are added. The retainers 60 are designed to be received within the rectangular openings heretofore used with wireway walls. Thus, the retainers 60 have a straight finger portion 60a adapted to extend across the channel of the wireway, and a bifurcated base portion 60b with legs 61, 62 that are resilient. Straight slots 63, 64 at the foot of each leg are adapted to receive parallel edges of adjacent fingers of a wireway side wall and support the retainer in cantilevered fashion above the bottom of the wireway channel. The portion 60a does not typically extend completely across the wireway and wires can be readily positioned beneath the finger, yet held by the finger in the lower portion of the wireway during additional wiring. The wall portions of the present side walls 12, 12' facilitate supporting the retainers 60 by providing rectangular apertures 65, 65' elongated longitudinally of the fingers 50, 50' and providing parallel side edges 66, 67 and 66', 67' that receive a retainer 60 and support it in cantilevered fashion across the channel, as shown in FIGS. 2 and 3. It will be understood that the apertures 65, 65' need not be provided if it is not desired to provide for the use of the retainer 60.

As best shown in FIG. 2, the height of the apertures 65, 65' allows for adjustment of the height of the finger-like retainers 60, so that they can be at a lower position initially and be moved upward to some extent as the wires occupy the space at the bottom of the wireway. In the embodiment shown, the apertures 65, 65' are somewhat shorter in length than the length of the fingers 50, 50'. With a retainer in the upper position as shown, more than one-half and preferably about 60 percent of the available area within the wire-way channel is beneath the retainer. One particular advantage in providing an aperture 65 in a finger 50 to receive the retainer, rather than engaging the retainer with sides of the fingers, as heretofore, is that with open-top wireways, the flexibility of the fingers makes it difficult to maintain the necessary tension on the retainer to retain it in its desired position. This problem is eliminated by providing a separate aperture, completely closed about its periphery.

Figure 5:
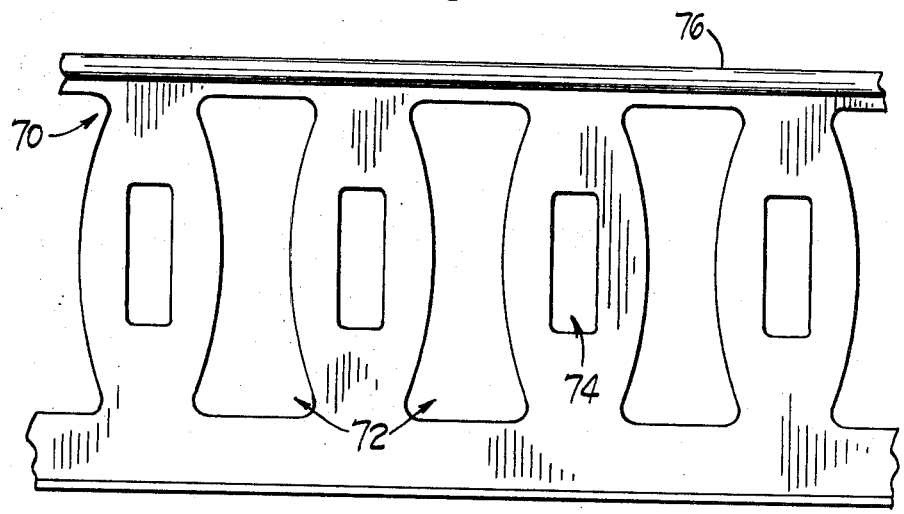
FIG. 5 is a side elevational view of a wireway wall similar to that of FIG. 4, but of modified construction.

FIG. 5 shows a wireway side wall 70 with transversely elongated openings 72 spaced longitudinally along the side wall, and with retainer receiving apertures 74 in each finger. This wireway side wall is essentially identical to the side wall 12 already described, except that it has a continuous bead portion 76 and therefore somewhat greater structural rigidity, but does not provide the access to the openings 72 that the passageways 52 provide. As illustrated by this embodiment, the shape of the openings and the use of apertures in the spaced fingers can suitably be used for closed-top wireways, eliminating any need for separate tooling when both types are produced.

Figure 6:
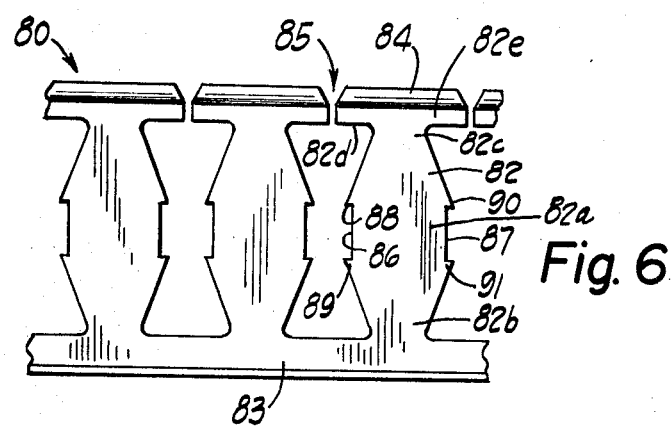
FIG. 6 is a side elevational view of a further construction of a wireway wall embodying the present invention.

A modified wireway side wall 80 embodying the present invention is shown in FIG. 6 of the drawings. This side wall is of the open-top or open-slot construction, similar to that shown in FIGS. 1 to 4, but is comprised of fingers 82 of modified shape. The fingers 82 are connected together by a wall portion 83 adjacent a mounting foot of the side wall. Each of the fingers 82 is shaped with a relatively wide central portion 82a and thinner portions 82b, 82c adjacent the ends. As with the embodiment shown in FIG. 4, the portion 82b at the connected end is somewhat wider than the portion 82c adjacent the distal end, and the distal end terminates in projections 82d, 82e that in part form a bead 84 for retaining a cover. A passageway 85 is provided between adjacent projections 82d, 82e. In this embodiment, each finger has, at its wide central portion 82a, parallel edge portions 86, 87 that extend in relatively short distance along the length of the finger, e.g., less than one-third the length in the preferred embodiment. Each such portion cooperates with an opposing portion on the next adjacent finger, to provide parallel surfaces for engaging the slots 63, 64 in a retainer 60. Thus, with this construction, a retainer 60 can be used between adjacent fingers without an auxiliary aperture and an increased stiffness of the fingers is obtained to resist bowing, but somewhat less reliability is achieved in securing the retainer in place. At opposite ends of the straight, parallel, portions 86, 87, abutments 88, 89 and 90, 91, respectively, restrain vertical movement of a retainer 60 so that it will not be inadvertently slid to a position along the fingers, where the opposed side edges of the adjacent fingers diverge. It will be understood that, if desired, the passageways 85 can be omitted to provide a closed-top wall.

While preferred embodiments of the present invention have been described in detail, it should be understood that various modifications or alterations may be made therein without departing from the spirit and scope of the invention defined in the appended claims.

What is claimed is:

1. An elongated wireway wall of thin sheet material with flat fingers extending from and joined together along one longitudinal side, extending transversely of the wall and spaced from each other longitudinally, each finger of at least a substantial segment of the wall having a single wide midportion that includes an opening with parallel sides that extend longitudinally of the finger, the sheet material forming each finger being narrower adjacent opposite ends, and each finger terminating at its distal end in oppositely extending projections that are spaced from the next adjacent projections to form a narrow passageway to the spaces between the associated finger and the next adjacent fingers, and a bead formed along the distal end of each finger.

2. An elongated wireway wall of thin sheet material with flat fingers extending from and joined together along one longitudinal side, extending transversely of the wall and spaced from each other longitudinally, each finger of at least a substantial segment of the wall having a single wide midportion and edge portions along opposite sides of said wide midportion that are parallel for the purpose of cooperating with the parallel side edge portion of the next adjacent finger to support wire retainers, the sheet material forming each finger being narrower adjacent opposite ends, and each finger terminating at its distal end in oppositely extending projections that are spaced from the next adjacent projections to form a narrow passageway to the spaces between the associated finger and the next adjacent fingers, and a bead formed along the distal end of each finger.

3. A wireway wall as defined in claim 2 including abutments on said fingers at opposite ends of said parallel edges.

4. An elongated wire way wall of thin sheet material with first openings extending in a direction across the wall and spaced longitudinally thereof, opposite ends of each of said first openings being wider than a midportion thereof and located adjacent opposite longitudinal edges of said wall and said openings having side edges that gradually diverge from the midportion toward the opposite ends, and second openings between successive ones of said first openings, substantially narrower and shorter than said first openings, elongated transversely of said wall, and having parallel side edges along at least a major portion of their length.

5. A wireway as defined in claim 4 wherein one said longitudinal edge having a continuous bead extending the length thereof.

6. A wireway wall as defined in claim 4 including a passageway at one end of each of said first openings extending through a longitudinal edge of said wall, said passageways being substantially narrower than the width of the ends of said first openings.

7. In a wireway constructed to form a channel for electrical wires, an elongated wireway wall of thin sheet material at least a portion of which is formed of a plurality of flat fingers connected to and extending transversely from one longitudinal edge of the wall and flexible transversely of the plane of said fingers, each finger being spaced from the next to provide openings through the wall through which wires may extend for connection to electrical equipment, the sheet material forming each finger being wider at the central part or midportion of the finger and tapering therefrom to a narrower width adjacent opposite ends, the midportion of each finger including edge portions on opposite sides that are parallel to each other and to such edge portions on the other fingers and that extend less than half the length of each finger, and each finger that is adjacent another on opposite sides terminating at its distal end in projections extending longitudinally of the wall in opposite directions, each projection being aligned with and spaced from a projection on the next adjacent finger to provide a narrow passageway to the opening between adjacent fingers, said opening being larger at opposite ends and progressively diminishing in size toward the middle.

8. In a wireway constructed to form a channel for electrical wires, an elongated wireway wall of thin sheet material at least a portion of which is formed of a plurality of flat fingers connected to and extending transversely from one longitudinal edge of the wall and flexible transversely of the plane of said fingers, each finger being spaced from the next to provide openings through the wall through which wires may extend for connection to electrical equipment, the sheet material forming each finger being wider at the central part or midportion of the finger and tapering therefrom to a narrower width adjacent opposite ends, an aperture in each finger at the midportion thereof, elongated longitudinally of and being substantially shorter than the finger, and having parallel side edge portions, and each finger that is adjacent another on opposite sides terminating at its distal end in projections extending longitudinally of the wall in opposite directions, each projection being aligned with and spaced from a projection on the next adjacent finger to provide a narrow passageway to the opening between adjacent fingers, said opening being larger at opposite ends and progressively diminishing in size toward the middle.

9. A wireway wall as defined in claim 8 including means along the distal end of each finger of greater thickness than the finger for engaging and retaining a cover for the wireway channel and a flange or foot along said one longitudinal edge substantially perpendicular thereto, for securing the wall to support structure.

10. A wireway wall as defined in claim 8 wherein the narrow portion of each finger adjacent the distal end is narrower than the narrow portion adjacent said one longitudinal edge.

References Cited
UNITED STATES PATENTS

| | | | |
|---|---|---|---|
| 2,082,099 | 6/1937 | Cruser | 174—72 A U |
| 3,024,301 | 3/1962 | Walch | 174—72 A |
| 3,156,765 | 11/1964 | Weiss | 174—72 A X |
| 3,229,029 | 1/1966 | Weiss | 174—72 A X |

DARRELL L. CLAY, Primary Examiner

U.S. Cl. X.R.

D26—10; 174— 68 C, 72 A